(12) United States Patent
Tabet et al.

(10) Patent No.: US 9,603,184 B2
(45) Date of Patent: Mar. 21, 2017

(54) TUNE BACK COORDINATION WITH CONNECTED MODE DISCONTINUOUS RECEIVE

(75) Inventors: Tarik Tabet, Los Gatos, CA (US); Paul V. Flynn, Menlo Park, CA (US); Sreevalsan Vallath, Dublin, CA (US); Kee-Bong Song, San Diego, CA (US); Syed A. Mujtaba, Santa Clara, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/602,067

(22) Filed: Aug. 31, 2012

(65) Prior Publication Data

US 2013/0315119 A1 Nov. 28, 2013

Related U.S. Application Data

(60) Provisional application No. 61/652,050, filed on May 25, 2012.

(51) Int. Cl.
*H04W 76/04* (2009.01)
*H04W 52/02* (2009.01)

(52) U.S. Cl.
CPC ..... *H04W 76/048* (2013.01); *H04W 52/0216* (2013.01); *H04W 76/046* (2013.01)

(58) Field of Classification Search
CPC . H04W 52/02; H04W 52/0203; H04W 84/12; H04W 52/28; H04W 52/0216; H04W 48/18; H04W 36/0055–36/0094; H04W 76/046; H04W 76/048; H04W 76/025; H04W 76/026; H04B 7/26
See application file for complete search history.

(56) References Cited

U.S. PATENT DOCUMENTS

| | | | |
|---|---|---|---|
| 7,916,675 B2* | 3/2011 | Dalsgaard et al. | 370/311 |
| 8,149,749 B2* | 4/2012 | Maeda et al. | 370/311 |
| 8,160,075 B2 | 4/2012 | Kazmi et al. | |
| 8,169,957 B2* | 5/2012 | Damnjanovic | 370/329 |
| 2007/0230401 A1* | 10/2007 | Rayzman et al. | 370/331 |
| 2008/0170526 A1 | 7/2008 | Narang et al. | |
| 2008/0219199 A1 | 9/2008 | Kohlmann et al. | |

(Continued)

OTHER PUBLICATIONS

International Search Report and Written Opinion for PCT application No. PCT/US2013/038514 dated May 30, 2013.

*Primary Examiner* — Ian N Moore
*Assistant Examiner* — Latresa McCallum
(74) *Attorney, Agent, or Firm* — Downey Brand LLP

(57) ABSTRACT

A method is disclosed for coordinating a user equipment's communication with a network during tune back with C-DRX (connected mode discontinuous receive). When a user equipment tunes back to a network after a tune away or a signal fade, a scheduling request is sent to the network to indicate the tune back as quickly as possible. The user equipment waits for a downlink transmission from the network. When the user equipment does not receive the downlink transmission, the method determines if the connection between the user equipment and the network has been released. The sending of the first scheduling request and any additional scheduling requests is coordinated with the C-DRX configuration so as to maximize the battery savings of C-DRX and minimize the latency of the tune back process in case the user equipment has uplink data to send.

20 Claims, 12 Drawing Sheets

(56) References Cited

U.S. PATENT DOCUMENTS

| | | | |
|---|---|---|---|
| 2008/0267105 A1 | 10/2008 | Wang et al. | |
| 2009/0215472 A1* | 8/2009 | Hsu | 455/458 |
| 2009/0296643 A1* | 12/2009 | Cave et al. | 370/329 |
| 2010/0113057 A1 | 5/2010 | Englund et al. | |
| 2010/0135159 A1 | 6/2010 | Chun et al. | |
| 2010/0202430 A1* | 8/2010 | Chin et al. | 370/342 |
| 2011/0269462 A1 | 11/2011 | Sagfors et al. | |
| 2012/0051226 A1 | 3/2012 | Cai | |
| 2012/0052860 A1* | 3/2012 | Faronius et al. | 455/426.1 |
| 2012/0076061 A1* | 3/2012 | Desai | H04W 52/0225 370/311 |
| 2012/0281566 A1* | 11/2012 | Pelletier | H04W 76/046 370/252 |
| 2013/0183982 A1* | 7/2013 | Martin et al. | 455/437 |
| 2013/0260758 A1 | 10/2013 | Zhao et al. | |

* cited by examiner

Method for coordinating a UE's communication with a network, which includes a tune back

TUNE BACK COORDINATION WITH CONNECTED MODE DISCONTINUOUS RECEIVE

CROSS-REFERENCE TO RELATED APPLICATION

This application claims priority under 35 U.S.C. 119(e) to U.S. Provisional Patent Application No. 61/652,050, filed May 25, 2012, and entitled "TUNE BACK COORDINATION WITH CONNECTED MODE DISCONTINUOUS RECEIVE", which is incorporated herein by reference in its entirety and for all purposes.

FIELD OF THE DESCRIBED EMBODIMENTS

The described embodiments relate generally to a user equipment's communication with a network and more particularly to coordinating a user equipment's communication with a network during tune back with C-DRX (connected mode discontinuous receive).

BACKGROUND

The $3^{rd}$ Generation Partnership Program (3GPP) works together with industry to forge mobile telephone standards such as the Long Term Evolution (LTE) phone specification. The LTE specification has developed a discontinuous receive (DRX) mode that can enable some power savings for the mobile handset (often referred to as user equipment or UE). The DRX mode allows the UE to disconnect or "sleep" for periods of time and thereby preserve battery life.

DRX mode was initially envisioned for use when the UE is disconnected from the network (NW), which means that the UE was not actively involved in transferring data between the UE and the NW. Another way to extend battery life is to allow a similar discontinuous receive mode to occur while the UE is connected to the NW. This connected mode discontinuous receive (C-DRX) can allow the UE to sleep, while connected to the NW but not actively transferring data with the NW.

Sometimes, the UE can tune away from an access point (eNodeB, for example) to perform other tasks. If the NW is aware of the tune-away time instances, the NW might configure the UE in C-DRX. When the UE returns to the eNodeB, the NW may be out of sync with the UE. This condition can also be true if the UE has suffered from a signal fade while in C-DRX.

When the UE returns after a long tune away or a long signal fade, the UE needs to indicate to the network that it has returned in order to quickly resume the communication. When the UE returns after having previously been in C-DRX configured by the network, the UE would like, among other desires, to: (1) indicate to the network that the UE has tuned back and to receive a confirmation back from the network, (2) benefit as much as possible from the battery savings of C-DRX, and (3) minimize the latency of the tune back process in case the user equipment has uplink data to send to the network or the network has downlink data to send to the UE.

Therefore, what is desired is a method to take advantage of the UE's C-DRX configuration while still indicating the tune back as quickly as possible.

SUMMARY OF THE DESCRIBED EMBODIMENTS

This specification describes various embodiments that relate to coordinating a user equipment's communication with a network during tune back with C-DRX (connected mode discontinuous receive).

In one embodiment, a method for a user equipment to communicate with a network can include the steps of: (1) establishing a connection between the user equipment and the network, (2) tuning away from the network, (3) tuning back to the network, (4) sending a scheduling request to the network, (5) waiting for a downlink transmission, and (6) determining if the connection between the user equipment and the network has been released when the user equipment does not receive the downlink transmission. In another embodiment, the user equipment sends the scheduling request when the user equipment is in a sleep phase or an "On" duration of C-DRX (connected mode discontinuous receive). In a further embodiment, the downlink transmission can be an uplink grant or downlink data.

In one embodiment, if the user equipment has no uplink data to send to the network and the scheduling request is sent during the sleep phase, the user equipment waits for the downlink transmission by remaining awake for a first predefined period of time before returning to sleep. In another embodiment, if the user equipment does not receive the downlink transmission by the end of the first predefined period of time, the user equipment returns to the sleep phase, enters the "On" duration, and waits for the downlink transmission for a second predefined period of time, which can be equal to zero. In a further embodiment, the user equipment sends additional scheduling requests, if the user equipment does not receive the downlink transmission by the end of the second predefined period of time. The user equipment sends an RRC re-establishment request, if the user equipment does not receive the downlink transmission after sending the additional scheduling requests.

In one embodiment, if the user equipment has uplink data to send to the network, the user equipment waits for the downlink transmission by continuing to send additional scheduling requests until the user equipment receives the downlink transmission. In another embodiment, if the user equipment does not receive the downlink transmission after sending the additional scheduling requests, the user equipment sends an RRC re-establishment request. In a further embodiment, if the user equipment does not receive the downlink transmission after sending the additional scheduling requests, the user equipment waits until the "On" duration to receive an RRC connection release before sending an RRC re-establishment request.

In one embodiment, a mobile wireless device includes an application processor configured to control establishing and releasing connections between the mobile wireless device and a wireless network. The application processor is further configured to tune the mobile wireless device back to the network after a tune away or a signal fade, send a request to the network, wait for a response from the network; and determine if the connection between the mobile wireless device and the network has been released when the mobile wireless device does not receive the response from the network. In another embodiment, the request includes a scheduling request. In a further embodiment, the response includes a downlink transmission.

In one embodiment, non-transitory computer readable medium for storing computer code executable by a processor in a user equipment having at least one wireless data transceiver and a memory is described. The computer readable medium includes at least the following computer code: (1) computer code for establishing a connection between the user equipment and a network, (2) computer code for tuning back to the network after a tune away or a signal fade, (3) computer code for sending a scheduling request to the network, (4) computer code for waiting for a downlink transmission, and (5) computer code for determining if the connection between the user equipment and the network has been released when the user equipment does not receive the downlink transmission.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 7B illustrates the tune back case with uplink (UL) data to send to the network.

FIG. 8A illustrates the case with no uplink (UL) data. FIG. 8B illustrates the case with uplink (UL) data.

DETAILED DESCRIPTION OF SELECTED EMBODIMENTS

Figure 1:
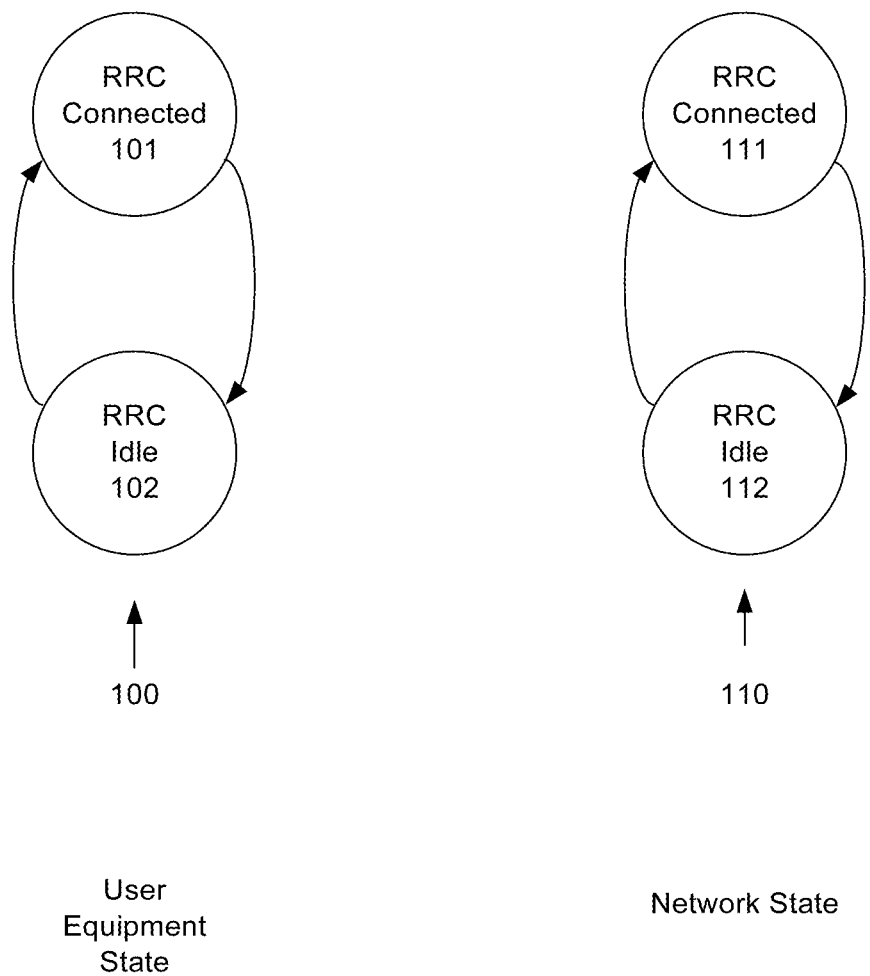
FIG. 1 is a state diagram showing possible operational states in user equipment (UE) and network (NW) devices within the context of a long term evolution (LTE) protocol.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Network communications protocols enable data exchange between two or more devices distributed within a network. If the network is a wireless network, certain accommodations can be designed into the communication protocol to support noisy communication channels. Some communication protocols, such as the Long Term Evolution (LTE) protocol set forth in the LTE specification from the $3^{rd}$ Generation Partnership Project (3GPP), can include state definitions for user equipment (UE). The states help define actions and behaviors between the UE and a network (NW). According to the LTE specification, the UE can be in an idle (RRC idle) or a connected (RRC connected) state, where RRC represents radio resource control.

Data can be transferred between the UE and NW, when the UE is in the RRC connected state. The NW often tracks the state of the UE to ensure that the UE can receive transmitted data. One way for the NW to track the state of the UE is to have a corresponding state represented in the NW. Therefore, when both the UE and the NW show the RRC connected state, the NW can transfer data. If the operational state of the UE goes out of sync with the representative state in the NW, then data transfer is stalled and the UE can become unresponsive.

If the UE or the NW can determine when a state mismatch exists (i.e., when the state of the UE does not match the equivalent state of the NW), then steps can be taken to bring the states back to alignment. The UE can monitor messages sent by the NW when the UE is in the RRC connected state. A state mismatch condition can be corrected by executing a procedure to correct for the mismatch. A state mismatch condition can be corrected by declaring a radio link failure. Declaring a radio link failure can cause some network devices to reset and start from a well defined state.

FIG. 1 is a state diagram showing possible operational states in UE and NW devices within the context of a LTE protocol, such as one set forth in the LTE specification from the $3^{rd}$ Generation Partnership Project (3GPP). The LTE protocol can allow multiple UE devices to operate within shared and limited radio resources. One way to control radio resources, such as time slots and radio frequencies, is by controlling the allocation of network and radio resources to a UE. Unless a UE is actively transferring data to and from the NW, the UE need not be assigned network and radio resources.

A UE can have states 100. A first state is radio resource control idle (RRC idle) 102. In RRC idle 102, data is not transferred between UE and the NW. A second state is RRC connected 101. In RRC connected 101 state, the UE has successfully negotiated with the NW for network and radio resources. Data can be transferred between the UE and NW in RRC connected 101 state.

The NW can have matching states 110. The NW expects the UE to be in either RRC connected 101 or RRC idle 102 states. More particularly, the NW expects the UE to be in a particular state, within the context of UE and NW operations. For example, if the UE has been assigned network and radio resources by the NW, then the NW expects the UE to be in RRC connected state 101. To track the UE RRC connected 101 state, the NW can have a matching state, RRC connected 111. In other words, RRC connected 111 can be the state that matches the UE state RRC connected 101. Similarly, RRC idle 112 can be the state in the NW that matches RRC idle 102 state in the UE.

The LTE communication protocol used by the UE and NW can rely on the NW expecting the UE to be in a specific state. For example, data can only be transferred between the UE and the NW when the UE is in RRC connected 101 state. If the UE is in RRC idle 102 state but the NW understands the UE to be in RRC connected 101 state (i.e., NW is in RRC connected 111 state), the NW can try to transfer data to the UE, but the data will not be received. When the operational state of the UE 100 does not match the corresponding state in the NW 110, a state mismatch exists and the UE and NW are said to be out of sync.

In one embodiment, the out of sync condition can occur under two situations: tune away and signal fading. In the tune away scenario, the UE remains connected to a first network, but the UE's radio is tuned away to listen to a second network. If this tune away lasts for a long time, the interrupted communication with the first network can cause an out of sync situation. In the signal fade scenario, the radio signal from the network can be attenuated due to multipath propagation or shadowing from obstacles. Again, if the fade lasts for a long time, the interrupted communication with the first network can cause an out of sync situation.

Figure 2:
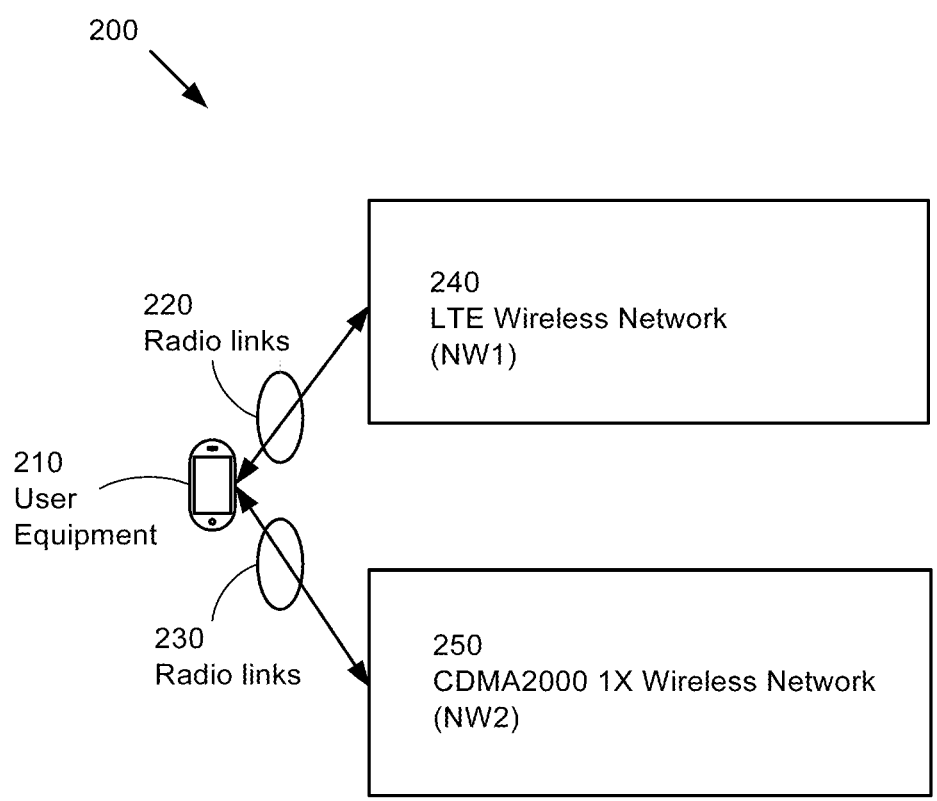
FIG. 2 illustrates a representative system configuration, where a user equipment can tune away from a first network (i.e., LTE (or LTE-Advanced) wireless communication network) to listen to a second network (i.e., CDMA2000 1× (RTT or EV-DO) wireless communication network).

FIG. 2 illustrates a representative system configuration, where a user equipment can tune away from a first network to listen to a second network. In one embodiment, a user equipment 210 device can camp on two different networks with one radio. The radio is normally connected to a first network (NW1) 240. From time to time, the radio is tuned away to listen to a channel on a second network (NW2) 250. In FIG. 2, this first network (NW1) 240 is an LTE (or LTE-Advanced) wireless communication network, while this second network (NW2) 250 is a CDMA2000 1× (RTT or EV-DO) wireless communication network. User equipment 210 connects to the first network 240 and the second network 250 through radio links 220 and 230, respectively.

Figure 3:
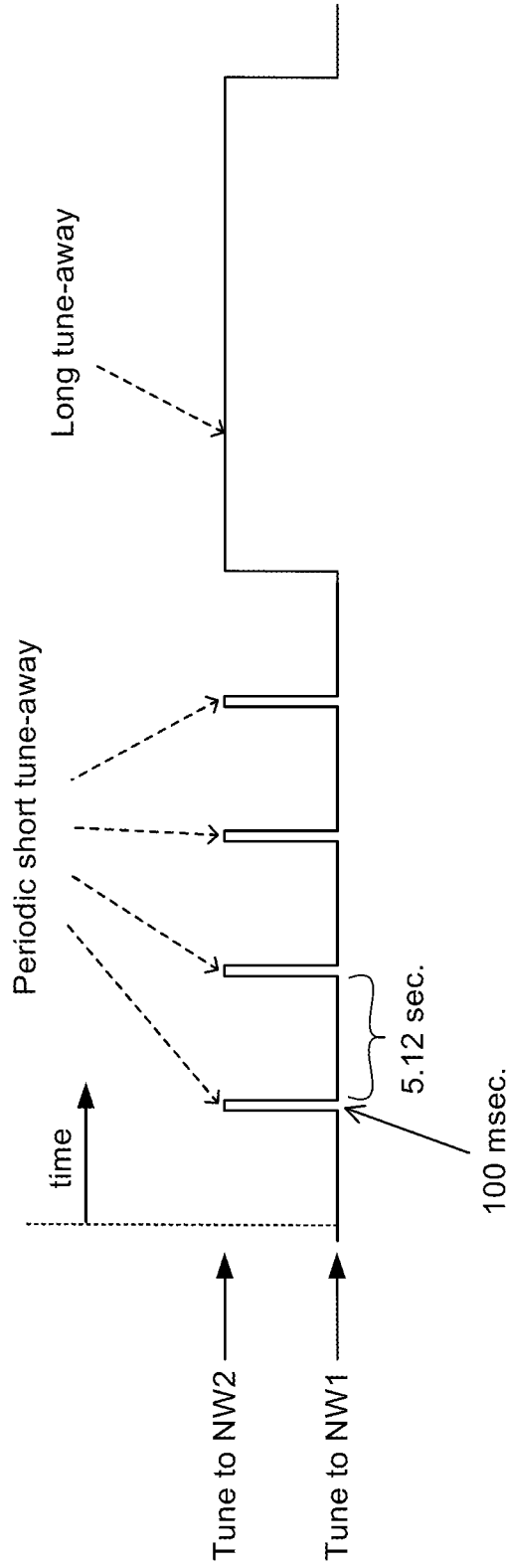
FIG. 3 illustrates an embodiment of a tune away using the system configuration of FIG. 2.

FIG. 3 illustrates an embodiment of a tune away using the system configuration of FIG. 2. In this embodiment, a user equipment 210 can be capable of receiving wireless radio frequency signals from an LTE wireless network (NW1) or from a CDMA2000 1× wireless network (NW2) individually but not from both wireless networks simultaneously (or in some instances, with only limited reception capabilities from both wireless networks simultaneously). Initially, the user equipment 210 can be associated with the LTE wireless network (NW1), e.g. connected to or camped on the LTE wireless network. The user equipment 210 can be registered simultaneously with both the LTE wireless network (NW1) and with the CDMA2000 1× wireless network (NW2). The CDMA2000 1× wireless network (NW2) can seek to establish a connection with the user equipment 210 by sending a paging message including a page addressed to the user equipment 210 during a paging interval. The user equipment 210 can tune a receiver away from the LTE wireless network (NW1) and to the CDMA2000 1× wireless network (NW2) to listen for a paging message that includes a page addressed to the user equipment 210. If no paging message including a page addressed to the user equipment 210 is received from the CDMA2000 1× wireless network (NW2), then the user equipment 210 can retune the receiver back to the LTE wireless network (NW1) in a relatively short time period, e.g. within approximately 100 ms. In order to listen for pages addressed to the user equipment 210 from the CDMA2000 1× wireless network (NW2), the user equipment 210 can tune a receiver to the CDMA2000 1× wireless network (NW2) during regular paging intervals. In an embodiment, a CDMA2000 1× wireless network (NW2) can operate with a paging cycle of approximately 5.12 seconds. This process of listening for NW2 pages with a paging cycle of 5.12 seconds and quickly returning back to NW1 (i.e., within 100 ms) is shown in FIG. 3 as a periodic short tune away.

After receiving a page addressed to the user equipment 210 from the CDMA2000 1× wireless network (NW2), the user equipment 210 can establish a connection with the CDMA2000 1× wireless network (NW2). The connection between the user equipment 210 and the CDMA2000 1× wireless network (NW2) can result in a long interruption to data traffic and signaling traffic between the user equipment 210 and the LTE wireless network (NW1). This long connection to NW2 is shown as the long tune away in FIG. 3. Downlink and uplink radio resources assigned by the LTE wireless network (NW1) to the user equipment 210 can remain unused during this long interruption if not suspended beforehand, which can unnecessarily waste scarce radio resources in the access network portion of the LTE wireless network (NW1). A radio resource control (RRC) connection to the LTE wireless network (NW1) can eventually time out due to a lack of acknowledgements being sent from the user equipment 210 to the LTE wireless network (NW1). The RRC connection can enter the idle state, or the connection between the user equipment 210 and the LTE wireless network can be dropped. When returning the receiver back to the LTE wireless network (NW1), the user equipment 210 can be required to re-establish a new RRC connection with the LTE wireless network (NW1). Therefore, a long tune away results in interrupted communication with the first network (NW1) that can cause an out of sync situation.

Figure 4:
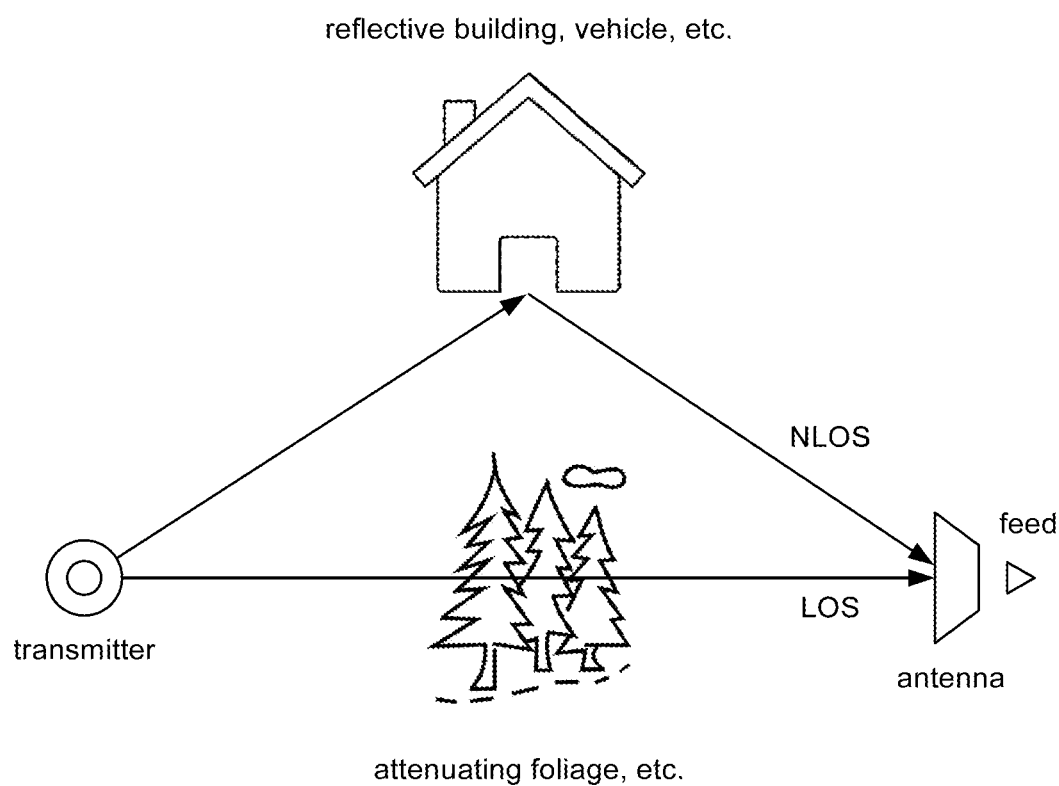
FIG. 4 illustrates signal fading in wireless communications.

FIG. 4 illustrates signal fading in wireless communications. Signal fading occurs when the radio signal from the network is attenuated due to multipath propagation or shadowing from obstacles. In multipath propagation, the radio signals reach the receiving antenna by two or more paths. Causes of these multipaths include atmospheric ducting, ionospheric reflection and refraction, and reflection from buildings, vehicles, water bodies and other terrestrial objects such as mountains. The effects of multipath include constructive and destructive interference, and phase shifting of the signal. Destructive interference causes fading. Multipath propagation is generally associated with non-line-of-sight (NLOS) signals. In shadowing, large obstruction such as foliage, a hill or a large building obscures the main signal path between the transmitter and the receiver, resulting in signal fading. Shadowing is generally associated with line-of-sight (LOS) signals. Signal fading can result in interrupted communication with the network, so a long fade can also cause an out of sync situation.

The DRX (discontinuous receive) mode saves power and extends battery life by enabling the UE to disconnect or "sleep" for periods of time. The UE and the network negotiate phases in which data transfer can occur. This is typically known as the "On" duration or the awake phase. During other times the UE turns its receiver off and enters a low power state. This is typically known as the sleep phase. During the sleep phase, the UE will be disconnected and not actively involved in the transfer of data between the UE and the NW. Another way to prolong battery life is to allow a similar discontinuous receive mode to occur while the UE is connected to the NW. This connected mode discontinuous receive (C-DRX) saves power by allowing the UE to sleep while connected to the NW, but not actively transferring data with the NW. Therefore, during the C-DRX sleep phase, the UE is still connected to the NW, but the UE is in a low power state and not actively transferring data with the NW.

Figure 5:
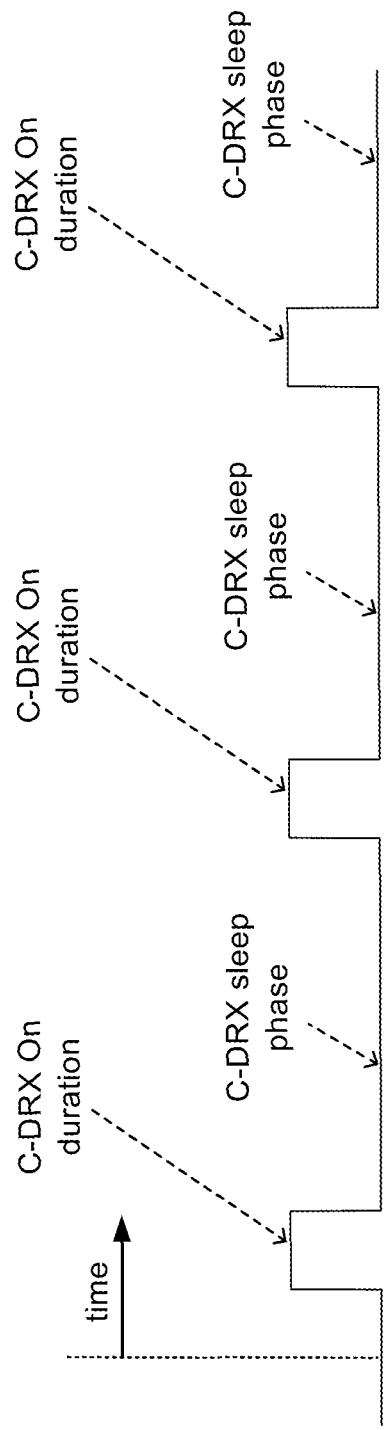
FIG. 5 illustrates a representative implementation of connected mode discontinuous receive (C-DRX).

FIG. 5 illustrates a representative implementation of connected mode discontinuous receive (C-DRX). FIG. 5 shows alternating periods of C-DRX sleep phase and C-DRX "On" duration (i.e., awake phase). The C-DRX sleep phase is a low power state when the UE is connected to the NW but not actively transferring data with the NW. The C-DRX "On" duration (i.e., awake phase) is a high power state when the UE can actively transfer data with the NW. In FIG. 5, the UE is shown to be mostly in a C-DRX sleep phase, but the UE is periodically "wakened" to be in the C-DRX "On" duration (i.e., awake phase). FIG. 5 shows the "On" duration cycle to be constant, but other configurations with varying cycles are also possible.

Figure 6:
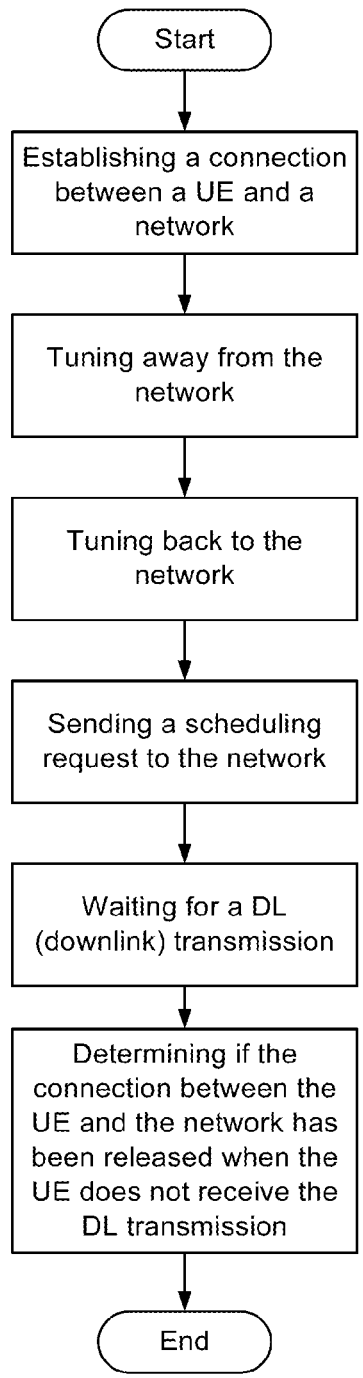
FIG. 6 illustrates a representative method for coordinating a user equipment's communication with a network, which includes a tune back.

FIG. 6 illustrates a representative method for coordinating a user equipment's communication with a network, which includes a tune back. In one embodiment, a UE establishes a connection with a network utilizing a C-DRX configuration. The C-DRX configuration helps to conserve power and extend battery life. The UE tunes away from the network. For example, the tune away can be to listen to a second different network. After a while, the UE tunes back to the network. If this was a long tune away, the interrupted communication with the network can cause an out of sync situation. Similarly, a long signal fade can also result in an out of sync situation due to the interrupted communication with the network. In order to minimize the out of sync situation, the UE would like to indicate to the network that it has tuned back and subsequently receive a confirmation from the first network. The UE wants to indicate its tune back to the network as quickly as possible, while still taking advantage of the UE's C-DRX configuration for power savings. The UE accomplishes this by sending a scheduling request to the network and then waiting for a downlink transmission from the network. In order to do this as quickly as possible, the user equipment sends the scheduling request whether the user equipment is in a sleep phase or an "On" duration of C-DRX (connected mode discontinuous receive). The scheduling request can be sent on PUCCH (physical uplink control channel) or RACH (random access channel) depending on the status of a time alignment timer. The downlink transmission can be either an uplink grant or downlink data. The uplink grant can be sent by the network in response to the scheduling request. In response to an uplink grant, the UE might send a data buffer occupancy called BSR (buffer status report). The uplink scheduling grant can assign a number of resource blocks to the UE for uplink transmission. The UE determines if the connection between the UE and the network has been released when the UE does not receive the downlink transmission. If the UE does not receive a downlink transmission in response to the scheduling request, it is likely that the network has released the UE's RRC connection. However, the UE may have to spend additional time waiting for receipt of the downlink transmission. The UE may also have to send additional scheduling requests to determine if the connection between the UE and the network has been released. In order to take advantage of the UE's C-DRX configuration for power savings, the UE determines when to spend additional time waiting and when to send additional scheduling requests based on whether the UE is in a C-DRX sleep phase or a C-DRX "On" duration and whether or not the UE has uplink data to upload to the network.

When the UE tunes back to the network, the UE can be in one of two states: (1) the UE has uplink data to upload to the NW and (2) the UE has no uplink data to upload to the NW. The UE considers whether the UE has uplink data to send, so as to minimize the latency of the tune back process.

UE has No Uplink Data to Send

Figure 7A:
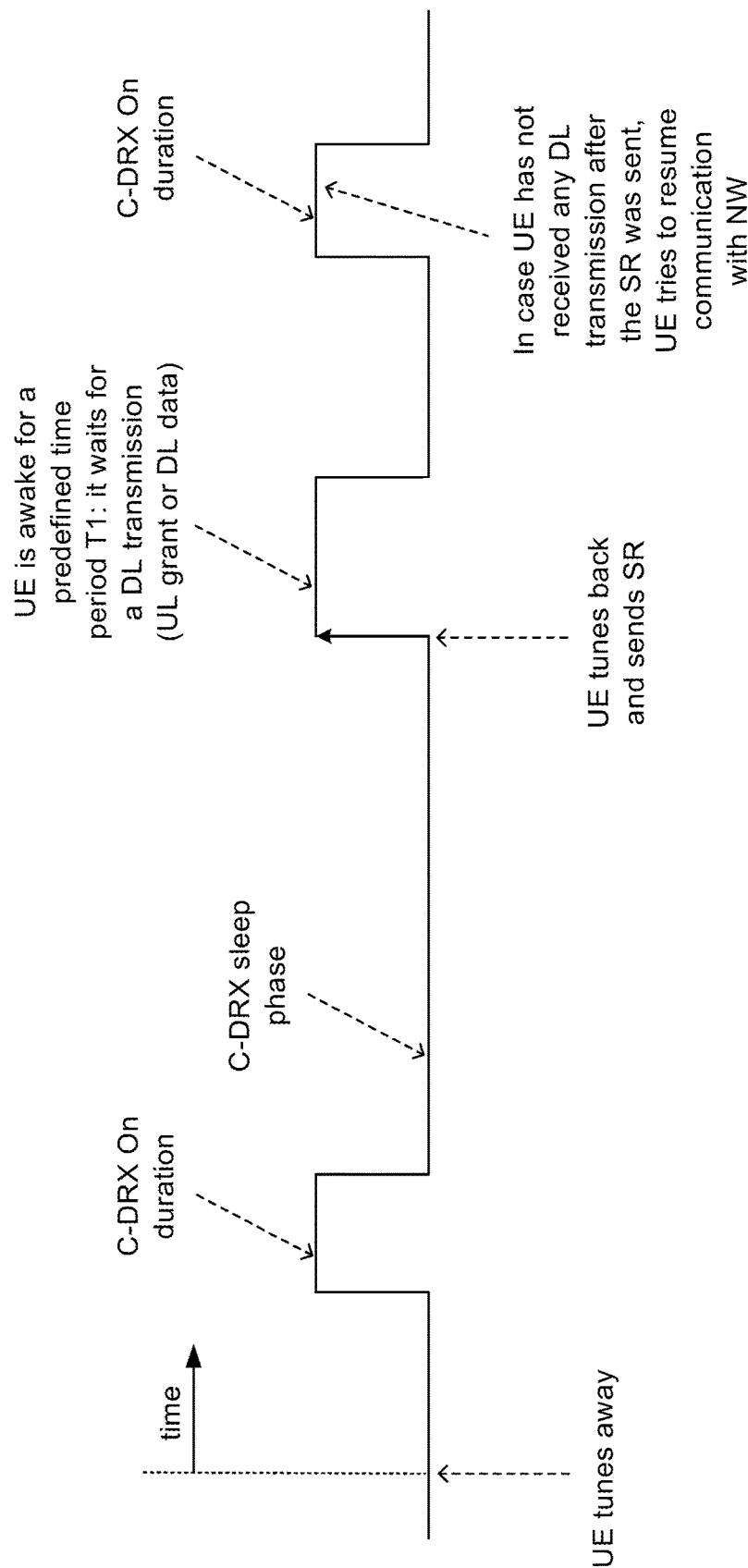
FIGS. 7A and 7B illustrate representative methods for coordinating a user equipment's communication with a network during tune back with C-DRX (connected mode discontinuous receive). 7A illustrates the tune back case with no uplink (UL) data to send to the network.

FIG. 7A illustrates a tune back case where the UE has no uplink (UL) data to send to the network. When the UE tunes back (or recovers from a deep fade), the UE can send a scheduling request (SR) to the NW. The SR can be sent independent of the C-DRX phase (i.e., independent of sleep or awake phase of C-DRX).

If the SR is sent during an agreed upon sleep phase, the UE can remain awake for a predefined time period T1 to receive a downlink transmission. If no downlink transmission is received by the end of the first predefined period of time, then the UE can return to sleep phase. After a while, the UE will enter the awake phase (i.e., "On" duration). If the UE does not receive any downlink transmission, then the UE can remain in the awake phase (i.e., "On" duration) and wait for a second time period (which may be equal to zero) for a downlink transmission before sending additional SRs. If the NW does not respond with any downlink transmission, the UE can determine if the radio resource control (RRC) connection has been released. The UE can then seek to reestablish the RRC connection with the NW. The UE can reestablish the RRC connection with the NW by sending an RRC re-establishment request.

If the SR is sent during an agreed upon awake phase (i.e., "On" duration), the UE can wait for a third time period (which may be equal to zero) for a downlink transmission before sending additional SRs. If the NW does not respond, the UE can determine if the radio resource control (RRC) connection has been released. The UE can then seek to reestablish the RRC connection with the NW. The UE can reestablish the RRC connection with the NW by sending an RRC re-establishment request.

UE has Uplink Data to Send

Figure 7B:
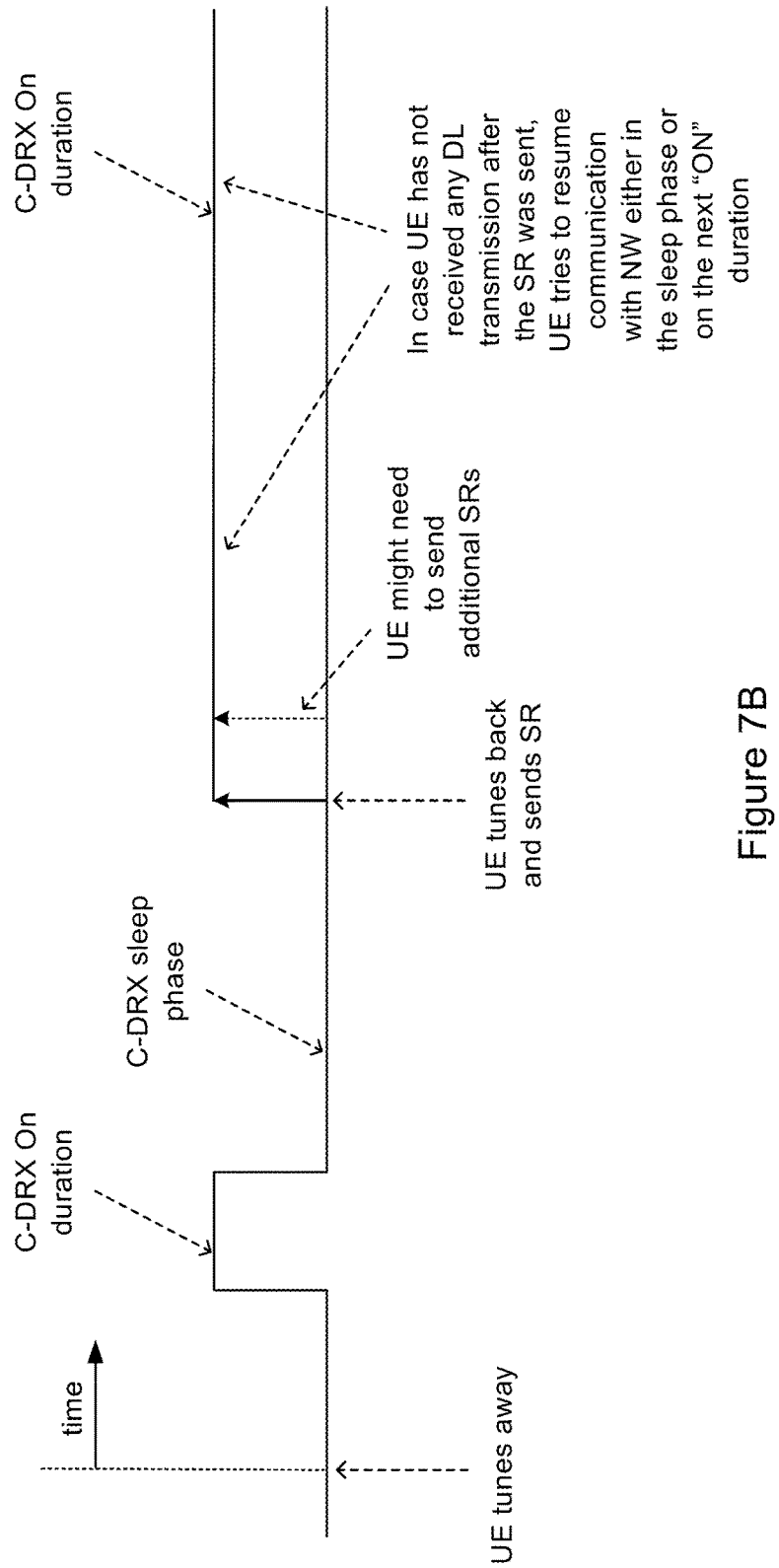

The procedure for a tune back case where the UE has uplink (UL) data to send to the network can be very similar to the case where the UE has no uplink data to send, but the UE would seek to quickly determine if the UE and the network are still connected so as to reduce the latency of the tune back process. This is accomplished by not waiting until the awake phase (i.e., "On" duration) to send the additional scheduling requests. FIG. 7B illustrates a tune back case where the UE has uplink (UL) data to send. When the UE tunes back (or recovers from a deep fade), the UE can immediately send a scheduling request (SR) to the NW. The SR can be sent independent of the C-DRX phase (i.e., independent of sleep or awake phase of C-DRX).

If the NW does not respond to the SR with any downlink transmission, then the NW may have released the UE's RRC connection. In one embodiment, the UE can proceed directly to RRC connection recovery if no downlink transmission was received in response to the first SR after waiting for a period of time. In this embodiment, only one SR is sent. In another embodiment, the UE can send additional SRs after not receiving downlink transmission to the first SR, so that more than one SR is sent. The UE might wait for a period of time before sending the additional SRs. In one embodiment, the waiting period is zero. This means the UE will send the SR periodically on every SR opportunity as configured by the NW. To recover, the UE can (1) seek to recover the RRC connection with the NW right away or (2) wait until the "On" duration to listen for a RRC connection release before trying to reestablish a connection with the NW. The UE can reestablish the RRC connection with the NW by sending an RRC re-establishment request.

Figure 8A:
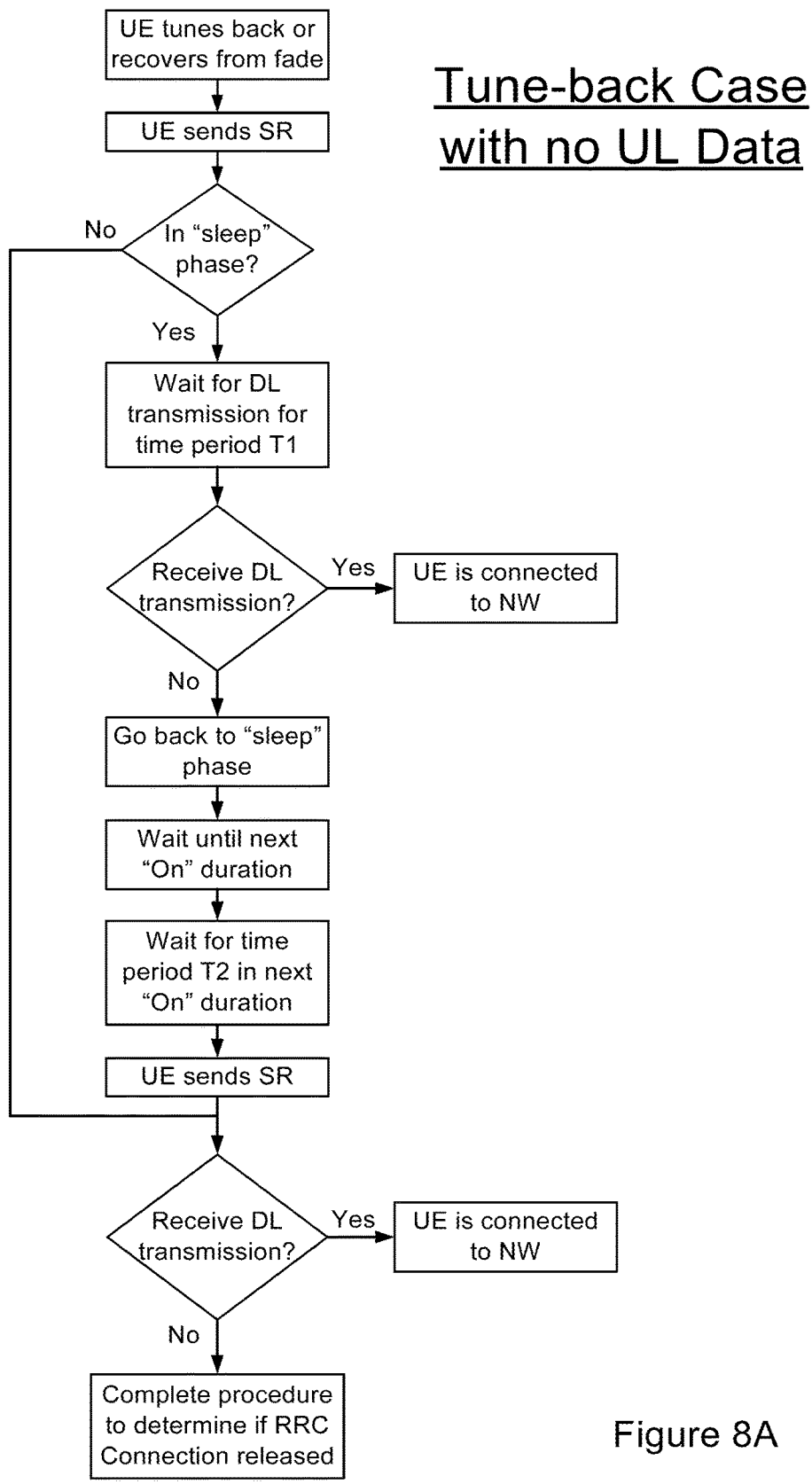
FIGS. 8A and 8B are flow charts that generally describe the methods shown in FIGS. 7A and 7B (i.e., methods for coordinating a user equipment's communication with a network during tune back with C-DRX (connected mode discontinuous receive)).
Figure 8B:
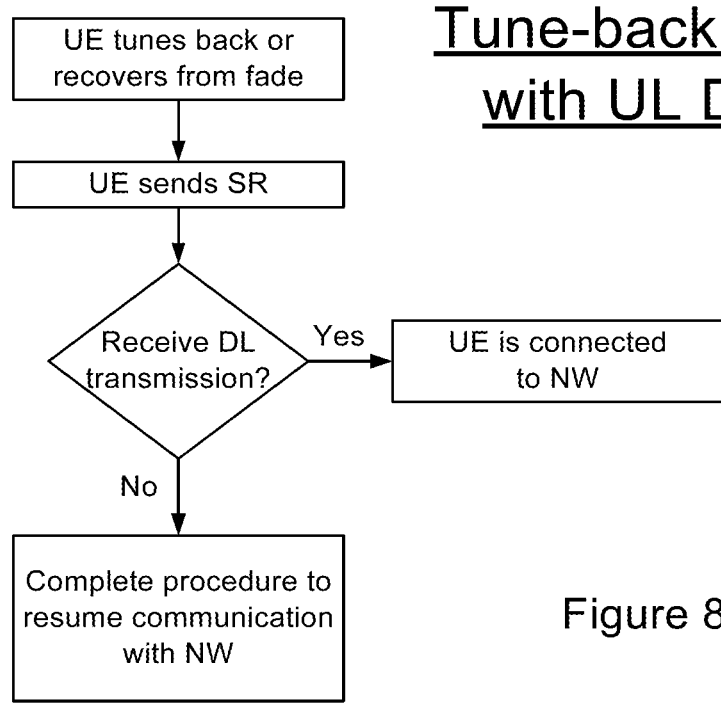

FIGS. 8A and 8B are flow charts that generally describe the methods shown in FIGS. 7A and 7B. FIG. 8A illustrates the case with no uplink (UL) data. FIG. 8B illustrates the case with uplink (UL) data. FIGS. 8A and 8B provide more details regarding the methods for coordinating a user equipment's communication with a network during tune back with C-DRX (connected mode discontinuous receive), as well as suggest further embodiments which embrace the spirit and principles of the described process. For example, in FIG. 8A (i.e., tune back case with no UL data), no additional SRs are sent, if the SR is sent during an agreed upon awake phase (i.e., "On" duration) and the UE does not receive a downlink transmission. If the NW does not respond with a downlink transmission, the UE proceeds directly to the step to complete procedure to determine if RRC connection has been released. Similarly, for example, in FIG. 8B (i.e., tune back case with UL data), no additional SRs are sent, if the UE does not receive a downlink transmission. Here, if the NW does not respond with a downlink transmission, the UE proceeds directly to the step to complete procedure to resume communication with NW.

Figure 9:
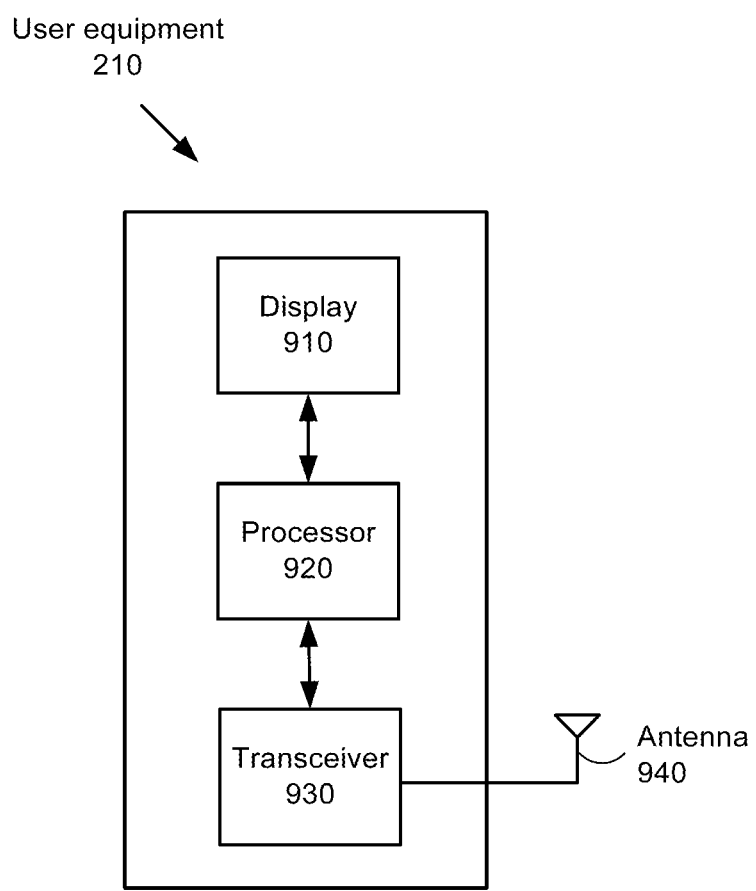
FIG. 9 illustrates elements of a representative user equipment.

FIG. 9 illustrates elements of a representative user equipment (UE) 210 that can communicate with one or more wireless communication networks, such as the LTE wireless network 240 or the CDMA2000 1× wireless network 250, as shown in FIG. 2. User equipment 210 can also be characterized as a mobile wireless device, a mobile handset, an electronic device, a computing device, or a portable device. User equipment 210 includes a display 910, a processor 920, a transceiver 930, and an antenna 940. When connected to the LTE wireless network 240 or the CDMA2000 1× wireless network 250, user equipment 210 can use transceiver 930 to transmit and receive radio signals. It is not shown here, but transceiver 930 can include one transmitter and two receivers. Use of dual receivers for both the LTE and the CDMA2000 1× wireless networks can provide higher receive signal quality and therefore higher data throughput and/or greater connection reliability under adverse signal conditions. Processor 920 can be configured to perform signal processing of either LTE or CDMA2000 1× radio signals transmitted or received through transceiver 930. Processor 920 can be further configured to perform "lower level" functions such as ensuring integrity of transmitted and received radio frequency signals that carry messages for the UE, as well as "higher level" functions such as establishing connections for applications and forming messages to be communicated with various wireless networks.

Figure 10:
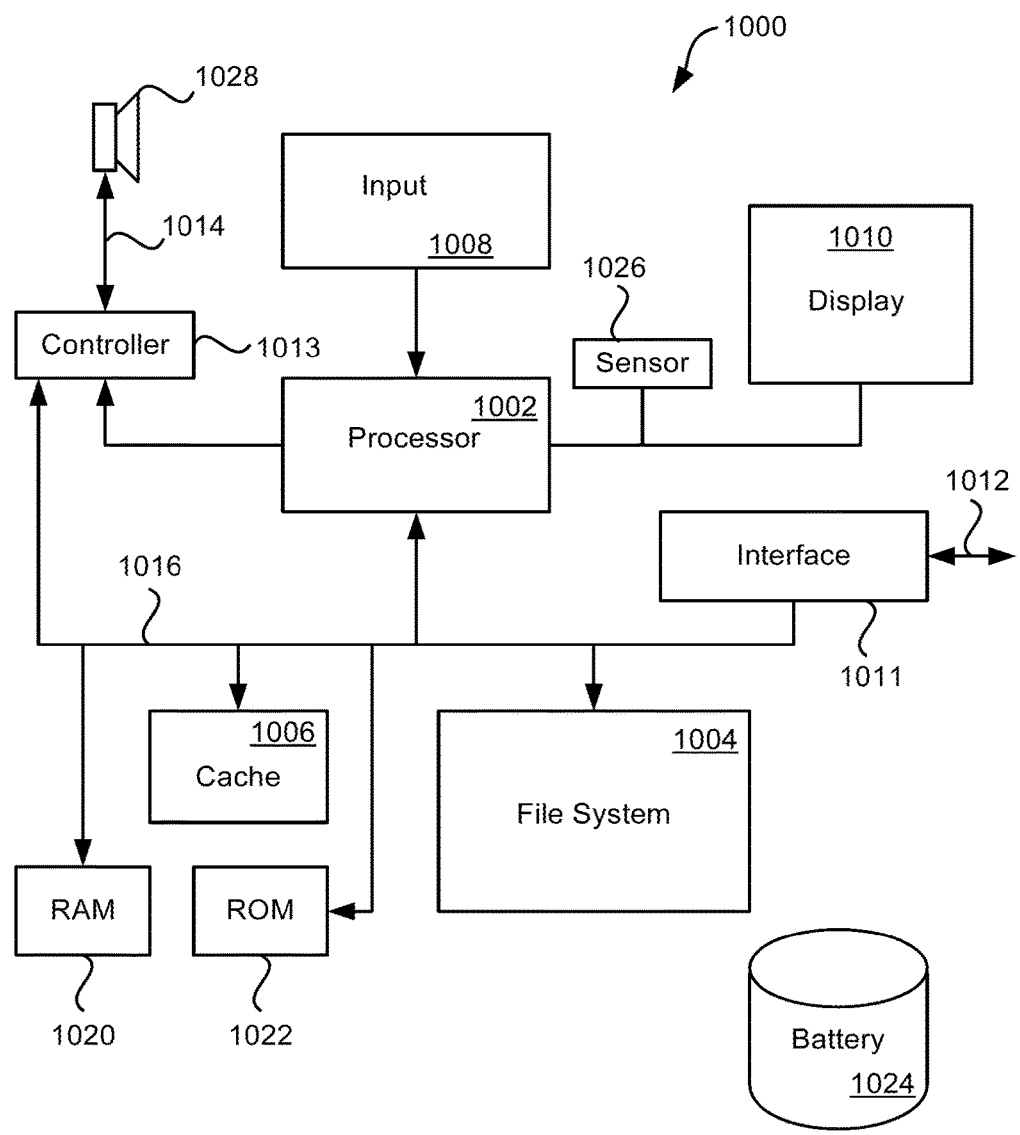
FIG. 10 illustrates a block diagram of an electronic device suitable for controlling some of the processes in the described embodiments.

FIG. 10 is a block diagram of an electronic device suitable for controlling some of the processes in the described embodiment. Electronic device 1000 can illustrate circuitry of a representative computing device. Electronic device 1000 can include a processor 1002 that pertains to a microprocessor or controller for controlling the overall operation of electronic device 1000. Electronic device 1000 can include instruction data pertaining to operating instructions, such as instructions for implementing and controlling a UE, in a file system 1004 and a cache 1006. File system 1004 can be a storage disk or a plurality of disks. In some embodiments, file system 1004 can be flash memory, semiconductor (solid state) memory or the like. The file system 1004 can typically provide high capacity storage capability for the electronic device 1000. However, since the access time for the file system 1004 can be relatively slow (especially if file system 1004 includes a mechanical disk drive), the electronic device 1000 can also include cache 1006. The cache 1006 can include, for example, Random-Access Memory (RAM) provided by semiconductor memory. The relative access time to the cache 1006 can be substantially shorter than for the file system 1004. However, cache 1006 may not have the large storage capacity of file system 1004. Further, file system 1004, when active, can consume more power than cache 1006. Power consumption often can be a concern when the electronic device 1000 is a portable device that is powered by battery 1024. The electronic device 1000 can also include a RAM 1020 and a Read-Only Memory (ROM) 1022. The ROM 1022 can store programs, utilities or processes to be executed in a non-volatile manner. The RAM 1020 can provide volatile data storage, such as for cache 1006

Electronic device 1000 can also include user input device 1008 that allows a user of the electronic device 1000 to interact with the electronic device 1000. For example, user input device 1008 can take a variety of forms, such as a button, keypad, dial, touch screen, audio input interface, visual/image capture input interface, input in the form of sensor data, etc. Still further, electronic device 1000 can include a display 1010 (screen display) that can be controlled by processor 1002 to display information, such as web pages, to the user. Data bus 1016 can facilitate data transfer between at least file system 1004, cache 1006, processor 1002, and input/output (I/O) controller 1013. I/O controller 1013 can be used to interface with and control different devices such as speakers, ear buds, microphone or video cameras through appropriate codecs. For example, control bus 1014 can be used to control speaker 1028.

Electronic device 1000 can also include a network/bus interface 1011 that couples to data link 1012. Data link 1012 can allow electronic device 1000 to couple to a host computer or to accessory devices or to other networks such as the internet. The data link 1012 can be provided over a wired connection or a wireless connection. In the case of a wireless connection, network/bus interface 1011 can include a wireless transceiver, such as a wireless transceiver configured to transmit and receive data according to the LTE protocol. Sensor 1026 can take the form of circuitry for detecting any number of stimuli. For example, sensor 1026 can include any number of sensors for monitoring a environmental conditions such as for example a Hall Effect sensor responsive to external magnetic field, an audio sensor, a light sensor such as a photometer, computer vision sensor to detect clarity, a temperature sensor and so on.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium executable by a processor. The computer readable medium is any data storage device that can store data which can thereafter be read by a computer system. Examples of the computer readable medium include read-only memory, random-access memory, CD-ROMs, HDDs, SSDs (solid-state drives), DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
by a wireless device:
establishing a Radio Resource Control (RRC) connection between the wireless device and a first network;
tuning a radio away from the first network to listen to a channel on a second network, without releasing the RRC connection with the first network;
tuning the radio from the second network back to the first network;
after tuning the radio from the second network back to the first network, sending a scheduling request during an agreed-upon sleep phase of a connected mode discontinuous receive (C-DRX) configuration to the first network when the wireless device has no uplink data to send to the first network;
waiting for a downlink transmission from the first network in response to the scheduling request by remaining awake for a first predefined period of time before returning to sleep;
when the wireless device does not receive the downlink transmission by an end of the first predefined period of time:
returning to sleep,
entering an On duration of the C-DRX configuration, waiting for the downlink transmission from the first network for a second predefined period of time, and
when the wireless device does not receive the downlink transmission by an end of the second predefined period of time:
determining that the RRC connection has been released by the first network.

2. The method of claim 1, wherein the second predefined period of time equals zero.

3. The method of claim 1, further comprising:
receiving, during the second predefined period of time, the downlink transmission, wherein the downlink transmission comprises an uplink grant or a portion of downlink data.

4. The method of claim 3, further comprising:
sending to the first network, responsive to the uplink grant, a buffer status report (BSR).

5. The method of claim 1, further comprising:
sending, before the determining that the RRC connection has been released, a second scheduling request to the first network.

6. The method of claim 5, wherein the sending a second scheduling request is during an agreed-upon sleep phase.

7. The method of claim 6, further comprising:
sending an RRC re-establishment request to the first network after the determining that the RRC connection has been released by the first network.

8. The method of claim 5, wherein the sending a second scheduling request is during an agreed-upon awake phase.

9. The method of claim 8, further comprising:
waiting for the downlink transmission from the first network for a third predefined period of time; and
sending, before the determining that the RRC connection has been released and after sending the second scheduling request, a third scheduling request to the first network.

10. A method comprising:
by a wireless device:
establishing a Radio Resource Control (RRC) connection between the wireless device and a first network;
tuning a radio away from the first network to listen to a channel on a second network, without releasing the RRC connection with the first network;
tuning the radio from the second network back to the first network;
after tuning the radio from the second network back to the first network, sending a scheduling request during an agreed-upon sleep phase of a connected mode discontinuous receive (C-DRX) configuration to the first network when the wireless device has no uplink data to send to the first network;
waiting for a downlink transmission from the first network in response to the scheduling request by remaining awake for a first predefined period of time before returning to sleep;
when the wireless device does not receive the downlink transmission by an end of the first predefined period of time:
sending an additional scheduling request to the first network;
waiting for an On duration of the C-DRX configuration;
when the wireless device does not receive the downlink transmission after: i) the sending the additional scheduling request, and ii) the waiting for an On duration:
determining that the RRC connection has been released by the first network, and
sending an RRC re-establishment request to the first network.

11. The method of claim 10, wherein the first network is a long term evolution (LTE) network.

12. The method of claim 10, wherein the second network is a CDMA2000 network.

13. The method of claim 10, wherein: i) the tuning the radio away is part of a series of periodic short-tune away events, and ii) the short tune-away events each have a duration of about 100 milliseconds.

14. A wireless device comprising:
a processor; and
a memory, wherein the memory comprises instructions that when executed by the processor cause the wireless device to perform steps comprising:
establishing a Radio Resource Control (RRC) connection between the wireless device and a first network;
tuning a radio away from the first network to listen to a channel on a second network, without releasing the RRC connection with the first network;
tuning the radio from the second network back to the first network;
after tuning the radio from the second network back to the first network, sending a scheduling request during an agreed-upon sleep phase of a connected mode discontinuous receive (C-DRX) configuration to the first network when the wireless device has no uplink data to send to the first network;

waiting for a downlink transmission from the first network in response to the scheduling request by remaining awake for a first predefined period of time before returning to sleep;

when the wireless device does not receive the downlink transmission by an end of the first predefined period of time:
  sending an additional scheduling request to the first network;
  waiting for an On duration of the C-DRX configuration;
  when the wireless device does not receive the downlink transmission after: i) the sending the additional scheduling request, and ii) the waiting for an On duration:
    determining that the RRC connection has been released by the first network, and
    sending an RRC re-establishment request to the first network.

15. The wireless device of claim 14, wherein the first network is a long term evolution (LTE) network.

16. The wireless device of claim 14, wherein the second network is a CDMA2000 network.

17. The wireless device of claim 14, wherein: i) the tuning the radio away is part of a series of periodic short-tune away events, and ii) the short tune-away events each have a duration of about 100 milliseconds.

18. The wireless device of claim 14, wherein execution of the instructions further cause the wireless device to perform steps comprising:
  receiving, during the first predefined period of time, the downlink transmission, wherein the downlink transmission comprises an uplink grant or a portion of downlink data.

19. The wireless device of claim 18, wherein execution of the instructions further cause the wireless device to perform steps comprising:
  sending to the first network, responsive to the uplink grant, a buffer status report (BSR).

20. An apparatus comprising:
a transceiver;
a processor coupled to the transceiver; and
a memory coupled to the processor, wherein the memory comprises instructions that when executed by the processor cause the apparatus to perform steps comprising:
  establishing a Radio Resource Control (RRC) connection between the apparatus and a first network;
  tuning a radio away from the first network to listen to a channel on a second network, without releasing the RRC connection with the first network;
  tuning the radio from the second network back to the first network;
  after tuning the radio from the second network back to the first network, sending a scheduling request during an agreed-upon sleep phase of a connected mode discontinuous receive (C-DRX) configuration to the first network when the apparatus has no uplink data to send to the first network;
  waiting for a downlink transmission from the first network in response to the scheduling request by remaining awake for a first predefined period of time before returning to sleep;
  when the apparatus does not receive the downlink transmission by an end of the first predefined period of time:
    sending an additional scheduling request to the first network;
    waiting for an On duration of the C-DRX configuration;
    when the apparatus does not receive the downlink transmission after: i) the sending the additional scheduling request, and ii) the waiting for an On duration:
      determining that the RRC connection has been released by the first network, and
      sending an RRC re-establishment request to the first network.

* * * * *